United States Patent [19]

Taylor et al.

[11] Patent Number: 4,526,309

[45] Date of Patent: Jul. 2, 1985

[54] COMPATIBLE COPYING OF COMPUTER FORM DOCUMENTS

[75] Inventors: Thomas N. Taylor, Rochester, N.Y.; John R. Ellis, Concord, Mass.; Lawrence C. Hubler, Fairport, N.Y.

[73] Assignee: Xerox Corporation, Stamford, Conn.

[21] Appl. No.: 417,257

[22] Filed: Sep. 13, 1982

[51] Int. Cl.³ .................. B65H 9/06; B65H 23/18; B65H 25/32; G03G 15/00

[52] U.S. Cl. ............................. 226/33; 226/43; 271/227; 271/236; 271/246; 271/250; 335/3 SH; 335/14 SH

[58] Field of Search ............ 226/27, 32, 33, 35, 226/134, 136, 24, 42, 43; 355/14 SH, 3 SH, 14 R, 50, 51, 75; 271/265, 266, 236, 227, 245, 246, 248, 250, 258, 259

[56] References Cited

U.S. PATENT DOCUMENTS

| | | | |
|---|---|---|---|
| 2,031,503 | 2/1936 | Rainey | 226/27 |
| 3,076,392 | 2/1963 | Cerasani et al. | 95/1.7 |
| 3,176,980 | 4/1965 | Mitchell et al. | 271/52 |
| 3,255,662 | 6/1966 | Call | 88/24 |
| 3,289,529 | 12/1966 | Darthenay | 88/24 |
| 3,319,051 | 5/1967 | Renold | 235/61.11 |
| 3,446,554 | 5/1969 | Hitchcock et al. | 355/75 |
| 3,768,904 | 10/1973 | Rodek | 355/40 |
| 3,804,514 | 4/1974 | Jasinski | 355/75 |
| 3,831,829 | 8/1974 | Karpisek | 226/83 |
| 3,877,804 | 4/1975 | Hoppner | 355/8 |
| 3,888,579 | 6/1975 | Rodek et al. | 355/14 |
| 3,888,585 | 6/1975 | Cross | 355/75 |
| 3,893,662 | 7/1975 | Boyd | 271/10 |
| 3,919,560 | 11/1975 | Nopper | 250/557 |
| 3,936,046 | 2/1976 | Stange | 271/250 |

(List continued on next page.)

FOREIGN PATENT DOCUMENTS

| | | |
|---|---|---|
| 0005043 | 10/1979 | European Pat. Off. |
| 0046675 | 3/1982 | European Pat. Off. |
| 55-18300 | 2/1980 | Japan |
| 55-140446 | 11/1980 | Japan |
| 175146 | 11/1982 | Japan |

OTHER PUBLICATIONS

Gustafson, Gary B., "Apparatus for Registering and Feeding Documents" Research Disclosure, No. 17322, Sep. 1978, pp. 40-43.

Primary Examiner—Harvey G. Hornsby
Assistant Examiner—Scott J. Haugland

[57] ABSTRACT

Automatically feeding document pages into registration over the conventional platen of a copier wherein the document pages comprise single page individual sheets and plural page connected unseparated segments of elongate computer forms webs, comprising: feeding the first document page automatically to the platen and registering it in an individual sheet document mode regardless of whether the first document page is an individual sheet or the first page of an elongate computer forms web; automatically sensing whether a computer forms web was so fed to the platen by sensing whether the document length exceeds a preset length and that said document has sprocket holes; and then automatically switching from said individual sheet document mode to a computer forms web document mode for the feeding and registering of subsequent document pages of a computer forms web in response to said sensing of a computer forms web, wherein in said computer forms web document mode the subsequent computer forms web page feeding and registrations are accomplished by incrementing the web in preset incremental feeding distances controlled by sensing sprocket holes in the computer forms web but with the same frictional (non-sprocket drive) feeder and without utilizing a mechanical registration gate; and wherein in said individual sheet document mode the individual sheet page registrations are by appropriately cycling a mechanical registration gate in and out of the document path.

8 Claims, 13 Drawing Figures

U.S. PATENT DOCUMENTS

| | | | |
|---|---|---|---|
| 3,973,846 | 8/1976 | Sullivan et al. | 355/16 |
| 3,977,780 | 8/1976 | Cassano et al. | 96/1 M |
| 3,988,065 | 10/1976 | Mileski et al. | 355/64 |
| 3,994,426 | 11/1976 | Zahradnik et al. | 226/51 |
| 3,997,093 | 12/1976 | Aizawa et al. | 226/11 |
| 4,000,943 | 1/1977 | Bar-On | 355/8 |
| 4,076,233 | 2/1978 | Knight et al. | 271/233 |
| 4,079,876 | 3/1978 | Malachowski | 226/75 |
| 4,082,263 | 4/1978 | Baumberger et al. | 226/134 X |
| 4,086,007 | 4/1978 | Smith et al. | 355/3 R |
| 4,087,087 | 5/1978 | Looney | 271/173 |
| 4,087,172 | 5/1978 | Van Dongen | 355/14 |
| 4,110,038 | 8/1978 | Irvine et al. | 355/50 |
| 4,111,412 | 9/1978 | Cathers | 271/251 |
| 4,132,401 | 1/1979 | Gauronski et al. | 271/245 |
| 4,144,550 | 3/1979 | Donohue et al. | 364/107 |
| 4,171,128 | 10/1979 | Irvine | 271/3 |
| 4,179,117 | 12/1979 | Rhodes, Jr. | 271/251 |
| 4,183,519 | 1/1980 | Harris | 271/245 |
| 4,191,467 | 3/1980 | Schieck | 355/75 |
| 4,213,603 | 7/1980 | Peffer et al. | 271/229 |
| 4,227,803 | 10/1980 | Massengeil et al. | 355/50 |
| 4,257,587 | 3/1981 | Smith | 271/236 |
| 4,266,762 | 5/1981 | Kramer et al. | 271/255 |
| 4,283,773 | 8/1981 | Daughton et al. | 364/900 |
| 4,300,710 | 11/1981 | DuBois et al. | 226/74 |
| 4,310,236 | 1/1982 | Connin | 355/14 SH |
| 4,320,960 | 3/1982 | Ward et al. | 355/14 R |
| 4,322,160 | 3/1982 | Kobus | 355/75 |
| 4,334,764 | 6/1982 | Rawson et al. | 355/14 SH |
| 4,335,954 | 6/1982 | Phelps | 355/14 SH |
| 4,353,541 | 10/1982 | Parzygnat | 271/275 |
| 4,358,197 | 11/1982 | Kukuca et al. | 355/14 R |

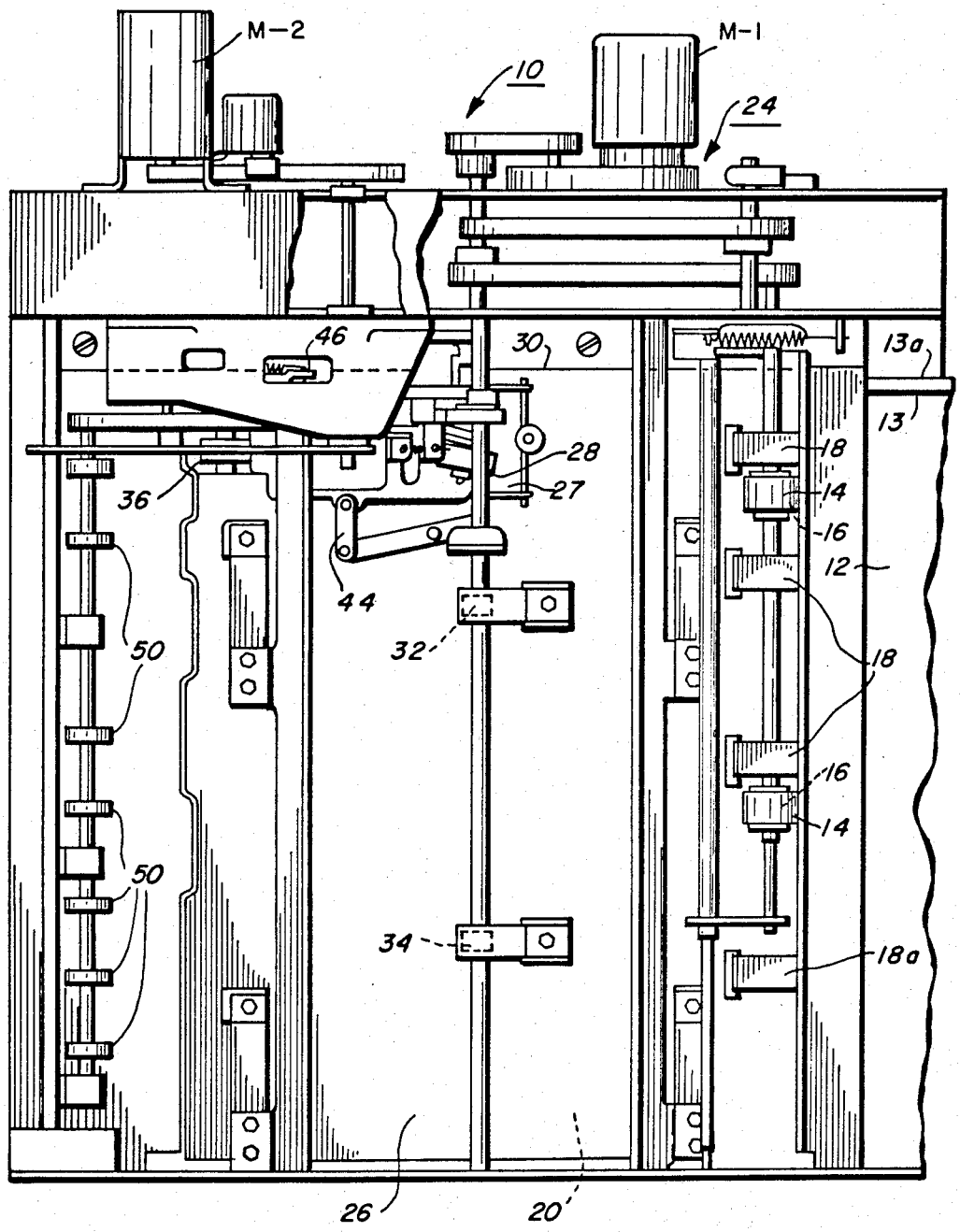

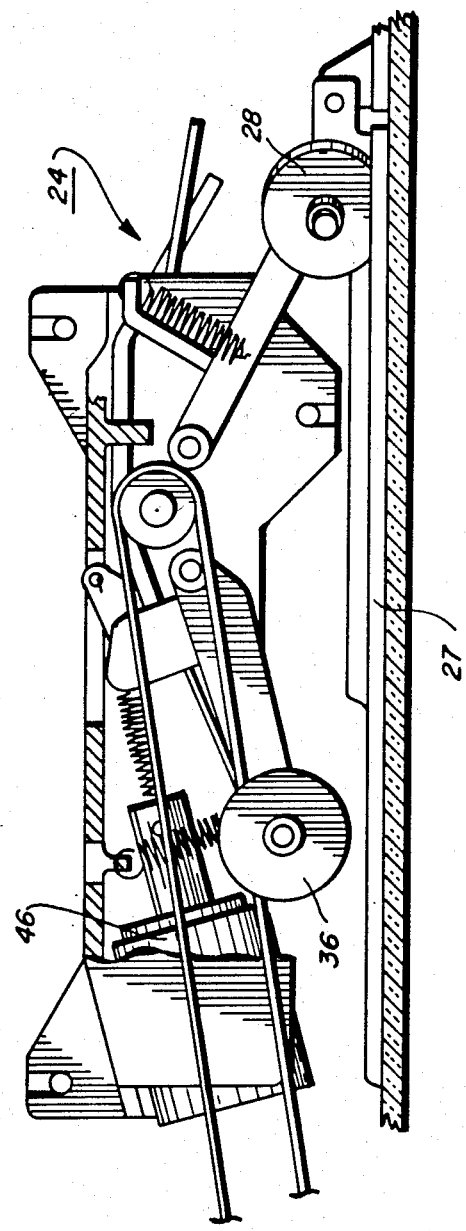

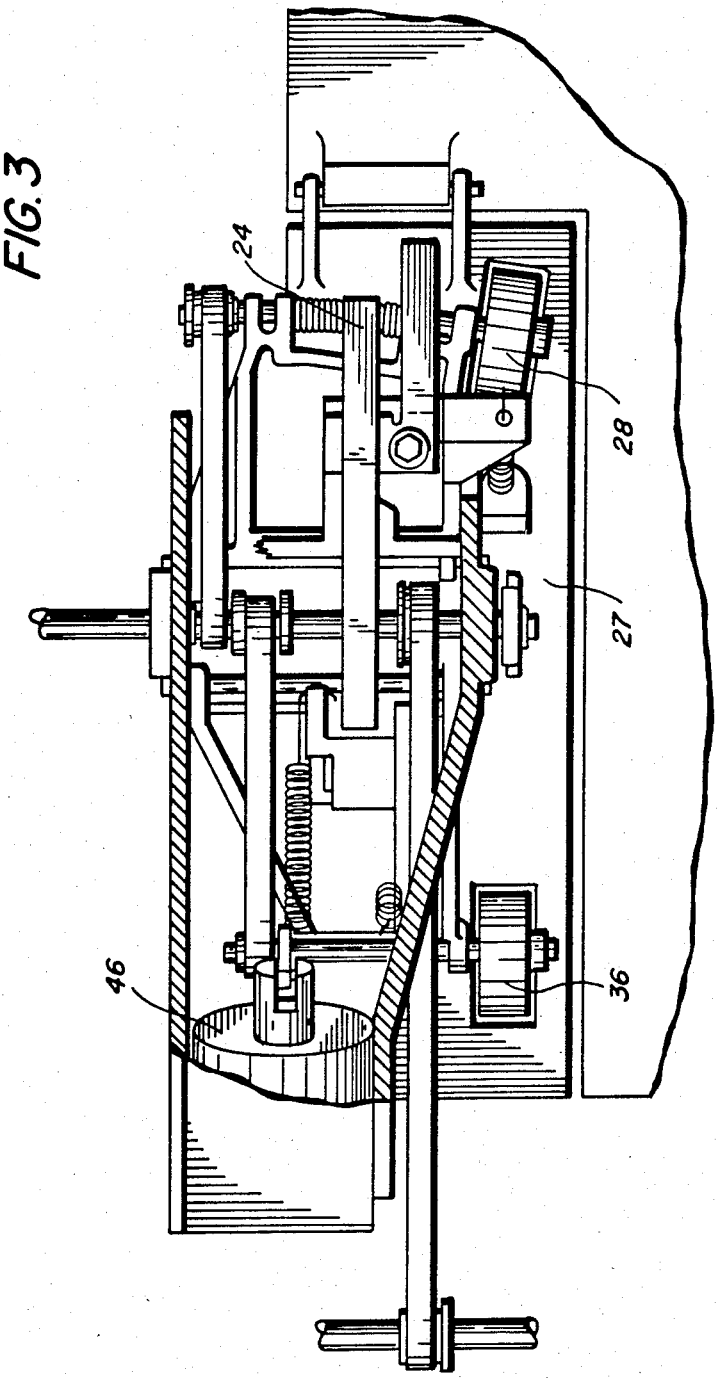

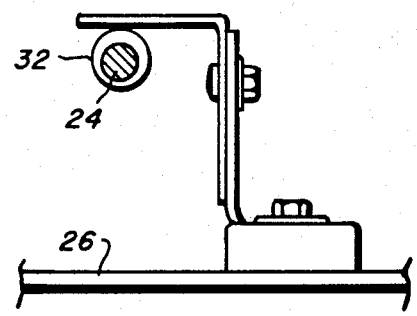
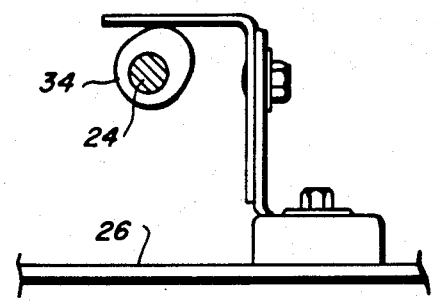
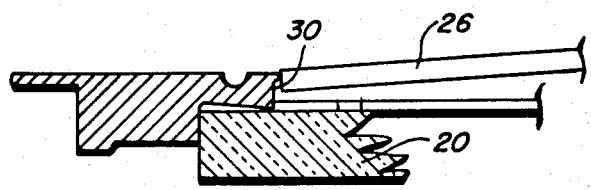

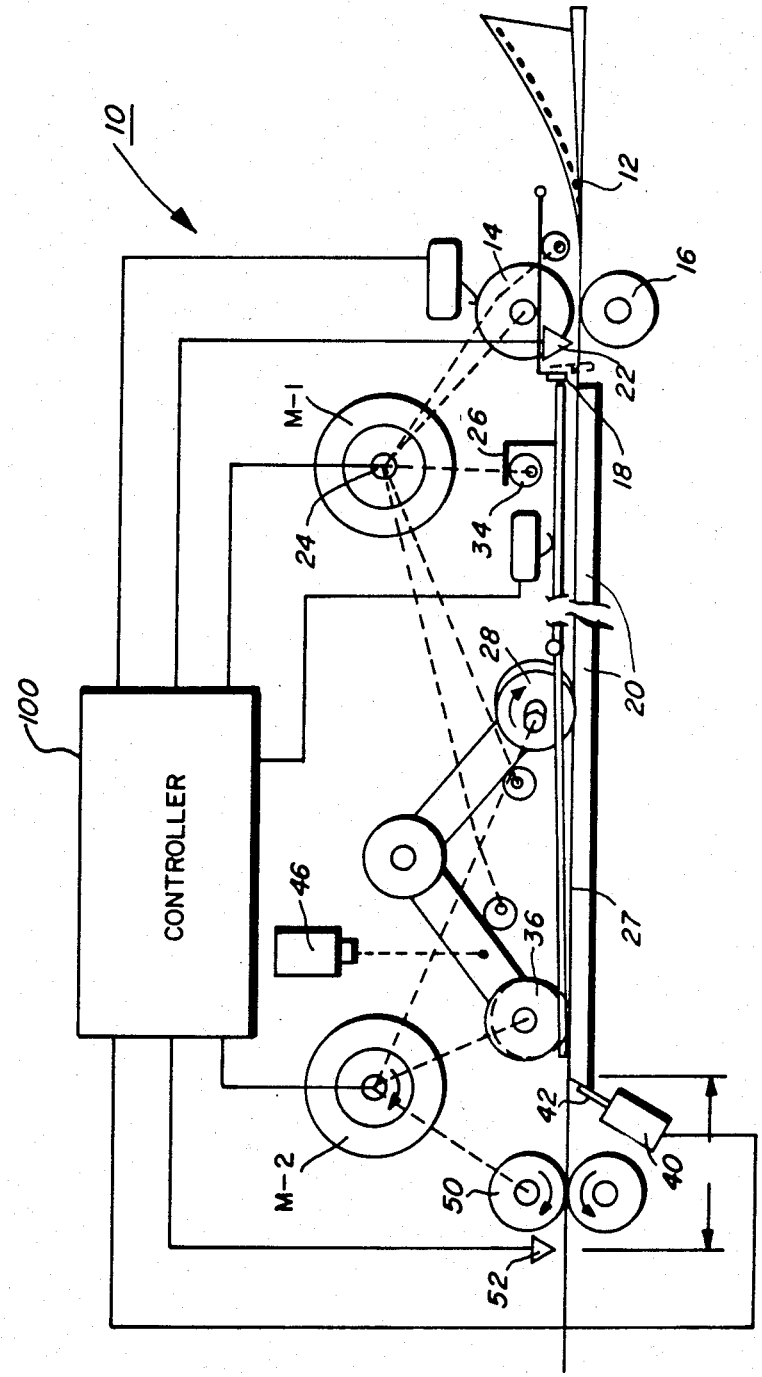

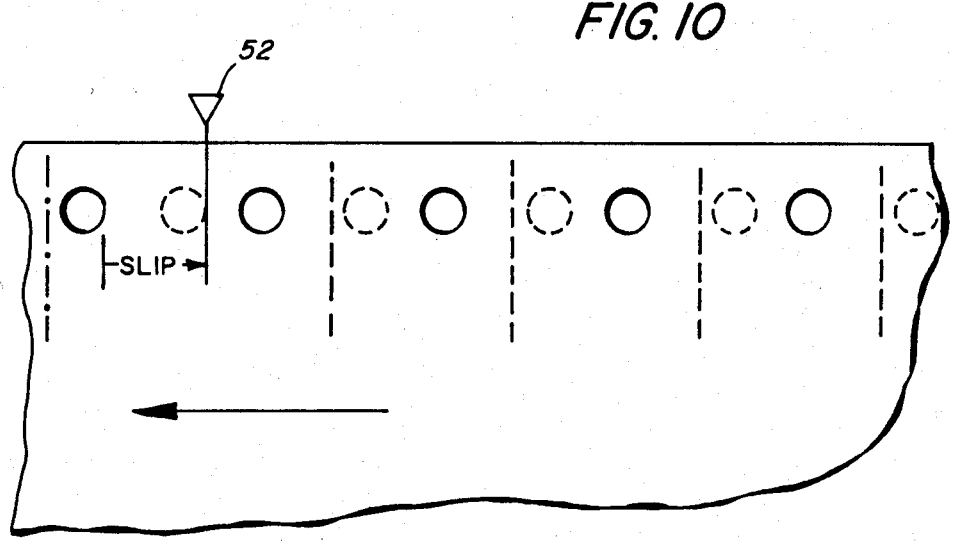

COMPATIBLE COPYING OF COMPUTER FORM DOCUMENTS

Cross-reference is made to commonly assigned copending application Ser. Nos. 410,734 filed Aug. 23, 1982 by Steven A. Gebhart, et al. and 416,183 filed Sept. 9, 1982 by Thomas N. Taylor and Stephen J. Wenthe, Jr.

The present invention relates to document handling systems for a copier and more particularly to an improved method and dual mode apparatus for automatically transporting and registering either computer form webs or conventional individual document sheets for copying on a copier platen.

As xerographic and other copiers increase in speed, and become more automatic, it is increasingly important to provide higher speed yet more reliable and more automatic handling of the original documents being copied, i.e. the input to the copier. It is desirable to feed, register and copy document sheets of a variety or mixture of sizes, types, weights, materials, conditions and susceptibility to damage, yet with minimal document jamming, wear or damage by the same document transporting and registration apparatus, even if the same documents are automatically fed and registered repeatedly. One type of original document presenting particular problems because of its differences and general incompatibility with conventional document sheet handling is computer form web or "CF" as referred to herein. This is the well known elongate web of odd-sized paper typically provided as the output of conventional computer printers. It comes in several different widths, but conventionally it has regular holes at ½ inch (12.7 mm) intervals for its feeder along (closely adjacent) both edges. Generally it is zig-zag or "fan" folded, and thus, CF web is also called "fan fold".

Even with slower copying rate copiers, it has become increasingly desirable to provide at least semi-automatic document handling, allowing an operator to "stream feed" originals into an input of the copier document handler, with the document handler automatically providing the final deskewing, registration and feeding of the documents into and through the copying position, and then ejecting the documents automatically. However, for compact and low cost copiers, an appropriate document handler must also be simple, low cost and compact.

A preferable document handling system is one that utilizes an existing or generally conventional copier optical imaging system, including the external transparent copying window (known as the platen) of the copier. It is also desirable that the document handling system be readily removable, as by pivoting away, to alternatively allow the copier operator to conventionally manually place documents, including books, on the same copying platen. Thus, a lighter weight document handler is desirable. It is also desirable for the same registration edge or position to be available for such manual copying as is used for the document handler.

In the description herein the term document "sheet" refers to a conventional flimsy sheet of paper, plastic, or other conventional or typical individual image substrate (original or previous copy), and the like, and not to microfilm or electronic image originals, which are generally much easier to manipulate. A "simplex" document or copy sheet is one having its page and image on only one side or face of the sheet, whereas a "duplex" document or copy sheet has pages and images on both sides. As used herein in relation to CF, a "page" is the CF web segment, portion, frame or unseparated sheet to be copied onto one copy sheet. This often, but not necessarily, corresponds to the area between partial transverse slits, known as "perfs", provided for "bursting" the CF web into individual sheets. The present system does not require such separation or bursting of a CF web for its copying, but is compatible with such prebursted CF sheets as well.

Illustrated herein is an exemplary semi-automatic document handler (SADH) as discussed above. However, apparatus in accordance with the present invention may also be used for compatible precollation copying of individual sheets, i.e. multiply automatically recirculated document copying provided by a recirculating document handling system or "RDH", particularly those which are dual mode (RDH/SADH) or otherwise compatible with non-precollation or post-collation copying, as disclosed for example in U.S. Pat. Nos. 4,080,063 issued Mar. 21, 1978 to D. J. Stemmle; 4,212,457 issued July 15, 1980 to J. Guenther; or 4,176,945 issued Dec. 4, 1979 to R. C. Holzhauser et al.

Although faster and more accurate automatic feeding and registration of the individual original document sheets to the correct position on the platen to be copied is desired, it is difficult to accomplish, especially without skewing (slightly rotating) the document and/or damaging the edge of the document being stopped. Document sheets can vary widely in sheet size, weight, thickness, material, condition, humidity, age, etc. Documents may have curls, wrinkles, tears, "dog-ears", cut-outs, overlays, paste-ups, tape, staples, adhesive areas, or other irregularities. Unlike copy sheets, which generally are all from the same batch and cut from the same paper reams, and therefore of almost exactly the same condition and size, original document sheets often vary considerably even if they are all of the same "standard" size, (e.g. letter size, legal size, A-4, B-4, computer form, etc.) because they have come from different paper batches or have variably changed size with different age or humidity conditions, etc. Yet it is desirable to automatically or semi-automatically rapidly feed, register and copy a set of individual documents with a mixture of sizes, types, and conditions without document jams or document damage and with each document correctly and accurately aligned to the registration position.

One of the most difficult to achieve requirements for automatic document handling is the accurate and reliable, but safe, registration of the original document at the proper position for copying. Conventionally the document is desirably automatically either center registered or corner registered (depending on the copier) by the document handler at a pre-set registration position relative to the copier platen, with two orthogonal edges of the document precisely aligned with two registration lines of the copier platen, so that the original document is precisely aligned with the copier optics and copy sheet registration system. This registration accuracy is desirably consistently within less than 1 millimeter. If the document is not properly registered, then undesirable dark borders and/or edge shadow images may appear on the ensuing copy, or information near an edge of the document may be lost, i.e. not copied onto the copy sheet.

As shown in the cited art, document handling systems have been provided with various document transports to move the original document sheets over the copier platen and into and out of registration. Various combinations of such transports are known with various registration devices or systems to register the original document for copying at the appropriate position relative to the transparent copying window. Typically the document sheet is registered by driving it against a gate or stop at or adjacent one edge of the platen. This may comprise projecting aligned fingers, or roller nips, or a single vertical surface, against which an edge of the sheet is driven into abutment to register the sheet. An important function of such registration is to also deskew the moving original document, i.e., to properly rotate and align it with the registration line as well as to determine and control its registration position.

As indicated, it is conventional to provide either fixed or retractable registration finger or gate document stopping edges aligned along the one edge of the platen, so as to physically register the document in its copying position. This also reduces transport criticality, i.e. allows slip or skewing of the document feeder to be accommodated and corrected. The document transport can be designed to slip briefly relative to the document lead edge striking the registration edge stop until positive deskewing and full registration are achieved. The same platen transport sheet feeder may be used to drive a document onto and off of the platen before and after copying as well as registering the lead edge of the document at the downstream platen edge. Registering the trail edge of the document by reversing the feeder and backing the document into a fixed registration edge at the upstream edge of the platen may be alternatively provided. In some document handling systems a system for also side registering or laterally positioning the document on the platen is used, i.e. positioning of the original on two axes on the platen. However this is not necessarily required, and lateral registration may be done upstream of the platen.

A severe limitation on such over-platen document sheet feeding and registering systems is that they must have sufficient friction to reliably feed the document sheet, but must slip relative to the platen glass when no document sheet is therebetween without scratching or wearing the glass such that imaging through the glass is affected. Generally they must also slip relative to the document when the document is stopped by a registration edge stop. Likewise the over-platen transport should not cause "show around" problems—i.e. undesirable dark areas or images on the copy sheet, especially for undersized documents, by visible portions of the transport extending beyond the document edges during copying. This has led to the use of single large white elastomeric belts for many document handlers in lieu of rollers or multiple belts, but such single belt systems have some inherent compromises in feeding and registration reliability. This is discussed, for example, in U.S. Pat. No. 4,353,541 filed Sept. 24, 1980 by W. J. Parzygnat and the art therein, and also disclosed in some of the references cited below.

Another such limitation or compromise is that a document feeding system which minimizes the introduction of document sheet skewing in the feeding system from the document set or stack to the registration position on the platen is highly desirable, in order to reduce the amount of skew needing correction (deskewing) in the registration position. Yet it is also desirable, but normally incompatible, to maximize document skewing during the document registration, i.e. to allow the document to be freely deskewed as it is driven into alignment with the registration edge. It is also desirable not to have excessive edge guide drag on the documents.

As to some of the individual features in the embodiment disclosed herein, one form of a "floating ski" (a planar, gravity floating sheet buckle-suppressing plate associated with a frictional sheet feed roller drawing copy sheets against an aligning surface) is disclosed in U.S. Pat. No. 4,087,087 issued May 2, 1978 to John H. Looney; and in FIG. 4 and its related description of allowed U.S. Pat. No. 4,358,197 filed Aug. 21, 1980 by W. P. Kukucka et al. Another such "scuffer wheel" feeder and associated gravity loaded assisting "ski" plate, for driving copy sheets against both the side and end walls of a sorter bin, is disclosed in FIG. 5 of pending U.S. application Ser. No. 180,184 filed Aug. 21, 1980 by Stephen A. Rhinehart et al. the EPO equivalent of which, application No. 81303835.3, was published Mar. 3, 1982 as EPO Publication No. 0046675.

Also, document feed wheel rollers for ejecting documents from the platen extending through apertures in a liftable document clamp (a planar light-reflective copying background surface) are disclosed, for example, in the above-cited U.S. Pat. No. 4,335,954, and in 3,888,585 issued June 10, 1975 to Thomas R. Cross.

Some examples of recirculating document handlers with on-platen document registration and deskewing are disclosed in U.S. Pat. Nos. 4,335,954 issuing June 22, 1982 to Russell L. Phelps; 4,278,344 issued July 14, 1981 to R. B. Sahay; 4,270,746 issued June 2, 1981 to T. J. Hamlin and 4,076,408 issued Feb. 28, 1978 to M. G. Reid, et al.

As to another individual feature disclosed hereinbelow, that of different diameter feed rollers, or a skewed roller, to induce a document skewing or edge registration force, there is noted, for example, by way of background, U.S. Pat. Nos. 3,893,662 to K. M. Boyd, issued July 8, 1975; 3,176,980 to T. J. Mitchell et al., issued Apr. 6, 1965; 3,936,046 to K. K. Stange, issued Feb. 3, 1976; 4,111,412 to W. P. Cathers, issued Sept. 5, 1978; 4,179,117 to J. H. Rhodes, Jr., issued Dec. 18, 1979; and Japanese Patent Application No. 54-48712 to S. Kikuchi, published Nov. 1, 1980 as No. 55-140446. Angled wheel (46) and belt (36) document feeders for lateral (side) registration are also illustrated in U.S. Pat. No. 4,322,160 issued Mar. 30, 1982 to G. S. Kobus and other references cited herein.

Feeding of document sheets into registration over the platen of a copier with a single relatively narrow central feeding belt is disclosed in U.K. Patent Specification No. 1,411,550 published Oct. 29, 1975 by Eastman Kodak Company (C. M. Brooks, et al.) and U.S. Pat. No. 4,076,233 issued Feb. 28, 1978 to C. Knight et al. (Xerox Corporation). The latter includes belt supporting rollers for contacting the platen in two separate areas, one of which rollers (400) closer to registration member 40 being movable. The following U.S. Patents are noted as to various other over-platen document sheet feeding systems using rollers rather than belts: U.S. Pat. Nos. 4,171,128 (Irvine); 4,183,519 (Harris); and 4,213,603 (Peffer et al.). 4,171,128 discloses an original document feeding device for a copier platen in which a system of roller pairs is used to move a document across a platen. The roller pairs can apparently be engaged separately for different positions of the document. U.S. Pat. No. 4,183,519 discloses a document sheet registration device wherein a pair of rollers 20 are used to move a document across the platen to its registration position against retractable fingers. U.S. Pat. No. 4,213,603 utilizes two pairs of rollers therefor.

The feeding of a web of computer fan-fold (CF) paper as a document to be copied on the platen of a copier presents special problems. Such paper is typically generated by a line-printer output of a computer. It is usually wider than most standard paper sizes, and conventionally has round holes at one-half inch (12.7 mm) intervals (center-to-center) extending along both edges. These holes are provided for sprocket or pin feeding the web. The web is typically folded in a zig-zag or "fan folded" stack of partially perforated but unburst segments. It is not desirable to burst or separate the CF web in many cases, yet in many cases it is desired to make registered individual sheet copies of segments of the CF web, especially if reduction copying onto conventional size paper copy sheets is desired.

Usually a CF web is directly mechanically fed without any slippage with a sprocket wheel or a belt with pins (a "tractor" or "Kidder" drive) mating with the holes along both edges of the CF web. Various examples of such computer form feeders (CFF) are known in the art, and some are cited below. However, a serious disadvantage of the use of such a pin or tractor feeder for a copier is that such a feeder obviously cannot also feed conventional unperforated original document sheets, and thus is incompatible with a conventional automatic document handler, thus requiring separate units, separately used, with additional expense. There have been a few attempted compatible document feeders for copiers using friction feeding attempting compatibility with both CF and conventional documents (examples are cited below). However, such non-sprocket CF web document feeders have the additional problem of obtaining and maintaining registration of the CF web segments to be copied if this is to be done onto individual copy sheets rather than a continuous copy web. With a pin drive CFF the incremental advance of the pin-drive system, e.g. a stepper motor, equals that of the CF web because there is no slippage, and thus only initial registration is needed. But this is not true of frictional document drive systems.

Of particular interest to this application are the following two references to CF document feeders for copiers: Publication No. 17322 in the "Research Disclosure" of "September 1978" pp. 40-43, especially the FIGS. 6-7 embodiment, by Industrial Opportunities, Ltd., Homewell, Havant, Hampshire, U.K., which discloses a frictional (non-pin) CF or sheet drive and CF hole counting; and U.S. Pat. No. 4,320,960 issued Mar. 23, 1982 (filed Sept. 17, 1979) to Joseph W. Ward and Russell G Schroeder. The former publication is believed to be the disclosure equivalent of a Japanese Utility Model laid open Feb. 5, 1980 as Laid-Open No. 55-18300 by Eastman Kodak Company and claiming priority from an abandoned U.S. application Ser. No. 924,040 filed July 12, 1978. The U.S. Pat. No. 4,320,960 discloses a tractor sprocket drive computer forms feeder (CFF) for a copier. However, it senses and utilizes for certain control functions the holes along the edge of the computer forms web. It relates to the Xerox "9400" copier document handling accessory unit for feeding computer forms automatically to the copier platen in a controlled manner. (Very similar CFF disclosures, with the same filing date as said U.S. Pat. No. 4,320,960, are in U.S. Pat. Nos. 4,264,189; 4,264,200; 4,299,477; and 4,313,672.)

Other examples of sprocket (pin or tractor) drive CFF for copiers, but apparently without CF hole sensing, are disclosed in U.S. Pat. Nos. 3,446,554 issued May 27, 1969 to A. M. Hitchcock et al. (known as the "inch worm" or "2400 CFP" feeder); 3,804,514 issued Apr. 16, 1974 to Stephan A. Jasinski; 3,831,829 issued Aug. 27, 1974 to L. S. Karpisek; 3,973,846 issued Aug. 10, 1976 to W. A. Sullivan et al; 3,977,780 issued Aug. 31, 1976 to J. R. Cassano et al; 3,994,426 issued Nov. 30, 1976 to George J. Zahradnik et al; 3,997,093 issued Dec. 14, 1976 to Masahiro Aizwa et al; 4,079,876 issued Mar. 21, 1978 to M. A. Malachowski; 4,087,172 issued May 2, 1978 to M. C. Van Dongen; 4,300,710 issued Nov. 17, 1981 to R. Clark Du Bois, et al; and 4,334,764 issued June 15, 1982 to L. E. J. Rawson, et al; and in the EPO Publication No. 0 005 043 of EPC Application No. 79300627.1 on Oct. 31, 1979 corresponding to abandoned U.S. application Ser. No. 896,877 filed Apr. 17, 1978 by John F. Gardner and Robert L. Greco (D/77201). Said above U.S Pat. No. 3,804,514 discloses a registration edge stop for individual conventional document sheets which is manually removable for CF feeding. Some of the above document feeders count pulses generated by the document feeding mechanism itself to control its stopping and starting.

Other known non-sprocket or frictional CF document feeders for a copier, in addition to the "Research Disclosure" Publication No. 17322 above, include the Xerox Corporation "3100" "LDC" and "3107" copiers, and the "Xerox Continuous Cassette (XCC)" roll fed copy web accessory therefor, and disclosures relating to CF accessories therefor in U.S. Pat. Nos. 4,086,007 issued Apr. 25, 1978 to Craig A. Smith et al. and 4,191,467 issued Mar. 4, 1980 to Richard A. Schieck. Also, U.S. Pat. No. 4,277,803 issued Oct. 14, 1980 to H. A. Massengeil et al is noted. These copiers and their document handlers are capable of dual funcion operation, i.e. copying individual conventional document sheets as well as CF web, but with certain inherent limitations or disadvantages as compared to the present system.

Other non-sprocket drive frictional CF feeders are known for microfilm cameras, e.g. U.S. Pat. Nos. 3,255,662 issued June 14, 1966 to D. D. Call and 3,289,529 issued Dec. 6, 1966 to G. R. Darthenay.

Other document feeders using moving document exposure systems rather than a conventional platen, while not necessarily expressly disclosing CF copying, may be usable therefor with limitations, e.g. U.S. Pat. No. 3,076,392 issued Feb. 5, 1963 to A. J. Cerasani, et al.

However, if a CF web is simply continuously moved over an imaging station (i.e. over a fixed optical scanning slit) it is difficult or impossible to obtain properly registered copying of selectable portions of the CF web onto individual copy sheets. That is, to repeatedly automatically copy one complete frame or section of the CF web onto only one copy sheet, or onto several copy sheets when more than one copy of that one CF frame or segment is desired. Since there is only one document lead edge for the CF web, conventional lead edge registration cannot be used for subsequent web frames. Nor can document feeding errors be corrected in this manner, and thus they may be cumulative for the subsequent web frames. Nor can the pitch distance or interval between CF frames be changed since they are directly connected. Lateral misregistration or skew feeding of the CF web also tends to be cumulative, i.e. increasing with the length of CF web which is fed. Furthermore, this type of CFF system is not directly compatible with full frame (full size platen) copying of stationary individual document sheets, which is particularly desirable for multiple copies.

In other fields of art, e.g. feeding of other webs with regular holes or other edge marking indicia, there are known control systems for controlling the position or feeding of such webs, e.g. U.S. Pat. Nos. 3,319,051 issued May 9, 1967 to Walter Renold and 3,919,560 issued Nov. 11, 1975 to Peter Nopper.

Document feeders in general providing corner (side as well as lead edge) document sheet registration, including those with angularly oriented frictional rollers, are known. E.g. U.S. Pat. Nos. 3,877,804 issued Apr. 15, 1975 to Werner F. Hoppner; 4,257,587 issued Mar. 24, 1981 to Wayne R. Smith relating to the Xerox "3109" copier; and 4,266,762 issued May 12, 1981 to William E. Kramer and Frank P. Malinowski relating to the Xerox "3300" copier; and references cited therein.

Of interest as disclosing a document sensor and input registration gate system for detecting oversize documents being inserted and inhibiting the gate operation is the disclosure thereof in U.S. Pat. No. 4,132,401 issued Jan. 2, 1979 to John F. Gauronski et al.

Examples of various other patents teaching conventional document handlers and also control systems therefor, including document path switches, are U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344 and 4,284,270. Simple software instructions for a copier's conventional microprocessor logic circuitry of document handler and copier control functions and logic, as taught by the above and other patents and various commercial copiers, are well known and preferred. Fixing of such software in read only memory (ROM) or programmable (PROM) hardware connected with or as part of the copier controller microprocessor is preferred. However, it will be appreciated that the document handling functions and controls described herein may be alternatively conventionally incorporated into a copier utilizing any other suitable or known logic circuits, switch controllers, etc. Software for functions described herein may vary depending on the particular microprocessor or microcomputer system utilized, of course, but will be already available to or readily programmable by those skilled in the art without experimentation from the descriptions provided herein.

The art on document feeding and positioning logic and control also specifically includes patents on servo motor driven and controlled document feeders for copiers. For example U.S. Pat. Nos. 3,768,904 issued Oct. 30, 1973 to V. Rodek; 3,888,579 issued June 10, 1975 to V. Rodek and R. Ticknor; 4,000,943 issued Jan. 4, 1977 to Ari Bar-On; 4,283,773 issued Aug. 11, 1981 to J. W. Daughton; 4,144,550 issued Mar. 13, 1979 to J. M. Donohue (Col. 53 et al. especially); and 4,310,236 issued Jan. 12, 1982 to J. L. Connin.

It is also known for copier jam detection to measure the time for passage of a copy sheet between two or more switches spaced along the copy sheet path and to actuate a jam signal or copier shut-down if that time period exceeds a preset time period (indicative of the sheet being jammed somewhere at or between the two switches). An example is disclosed in U.S. Pat. No. 4,084,900 issued Apr. 18, 1978 to S. Yamaoka, et al.

All references cited herein, and their references, are incorporated by reference herein for appropriate teachings of additional or alternative details, features, and/or technical background.

The present invention desirably overcomes or reduces various of the above-discussed problems.

It is a general feature of the system disclosed herein to provide for automatic copying of individual pages, segments, sections or frames of a computer form paper web onto individual copy sheets with appropriate registration with a document feeding system which also compatibly feeds conventional document sheets for said copying on the same platen with the same document feeding apparatus.

It is a further disclosed feature to provide a document handling system which accepts the input of either CF webs or conventional document sheets and senses which is being fed and automatically switches its mode of operation accordingly, to automatically provide a fully compatible dual input mode original document handler for a copier.

It is a further disclosed feature to provide such dual input compatibility automatically without requiring any operator modification or manipulation of the document handling apparatus.

It is an additional disclosed feature to provide an automatic document feeder for automatically feeding a series of document pages into registration over the conventional existing platen of a copier wherein the document pages may comprise either various individual sheets or unseparated segments of CF paper web, and wherein the document feeder feeds in and registers the first document page automatically in the same manner regardless of its type, determines whether it is an individual sheet or a CF web, and then automatically switches to a sheet copying mode or a CF web copying mode for the subsequent document pages. In said CF web copying mode the subsequent CF page registrations are accomplished by counting the CF sprocket holes in a controlled manner without utilizing registration gates, whereas in said sheet copying mode the subsequent page registrations are by appropriately cycling at least one registration gate in and out of the document path.

There is disclosed herein the feature of alternatively feeding and registering individual document sheets or computer form web documents to the imaging station of a copier including the steps of inserting either type of document into a common document feeding apparatus, automatically sensing and determining which type of document was inserted, and automatically initiating incremental feeding of incremental portions of a computer form web in response to sensing that a computer form web was so inserted.

Another specific feature disclosed herein is to provide, in a document handling apparatus for a copier having a platen for supporting and copying a document at the imaging station of the copier, the improvement in a dual mode document handling apparatus for automatically copying on said platen documents comprising either computer form web original documents or individual original document sheets, comprising: common input means for receiving either of said documents; common feeding means for moving either of said documents onto and over said platen; registration means for automatically positioning either of said documents for copying on said platen; sensing means for sensing when a computer form web document has been fed into said document handling apparatus through said common input means; and dual mode control means responsive to said sensing means for differently controlling said common feeding means and said registration means automatically depending on whether a computer form web or individual sheet document has been fed into said document handling apparatus through said common input means.

Further features which may be provided by the method and apparatus disclosed herein, individually or in combination, include those wherein said common feeding means is a frictional non-sprocket feeder and provides automatic self-threading of computer form web; said registration means includes common initial registration stop means for mechanically registering the lead edge of each individual sheet and only the lead edge of a computer form web on said platen, and said registration means further including means for incrementally moving subsequent predetermined incremental length portions of said computer form web in said increments over said platen with said common feeding means and without utilizing said initial registration means and wherein said control means monitors both said common feeding means and the movement of said web for briefly incrementally halting the computer form web motion after each said incremental length of computer form web has been moved to said platen by said common feeding means; the said common input means, said common feeding means and said registration means are operated by said dual mode control means in the same manner for the initial portion of computer forms web as for an individual document sheet but in a different manner for all subsequent portions of a computer forms web; further including platen overlying document clamping means, and wherein said common frictional document feeding means includes a frictional feeding roller and an independently movable minor flap portion of said clamping means for resisting buckling of documents fed by said frictional roller, said roller extending through said flap portion over said platen, and said flap portion extending pivotably from adjacent said single roller to closely adjacent said platen registration edge position; wherein only the first page of a computer form web, but all individual document sheets, are registered against a mechanical registration gate adjacent one edge of the platen; wherein said common feeding includes initially establishing side edge (lateral) registration of a computer form web being fed with a lateral registration method which is fully compatible with side edge registration of individual sheets and utilizes said common frictional document feeding apparatus; wherein said common feeding means for feeding both types of documents comprises a frictional feed wheel rotated over the platen and plural document nip exit rollers downstream of the platen, both commonly driven for different time periods in said first and second modes of operation; and wherein said frictional feed wheel is automatically lifted and optically shuttered to present its exposure during the copying of a document.

Various of the above-mentioned and further features and advantages will be apparent from the examples described hereinbelow of specific apparatus and steps of operation. The invention will be better understood by reference to the following description of one specific embodiment thereof including the following drawing figures (approximately to scale) wherein:

FIG. 1 is a top view (with normal covers removed) of an embodiment of an exemplary dual mode (conventional or CF) document handling apparatus in accordance with the present invention;

FIGS. 2 and 3 are a partial enlarged side and top view respectively of the document transport and side registration system embodiment of FIG. 1;

FIGS. 4-8 are partial enlarged side views of portions of the apparatus of FIGS. 1-3;

FIG. 9 is a functional schematic side view of the apparatus of FIGS. 1-8 particularly illustrating sensor and control functions;

FIG. 10 is a plan view of a segment of computor form web for illustrating the method of registration including sprocket hole validations.

Figure 11:
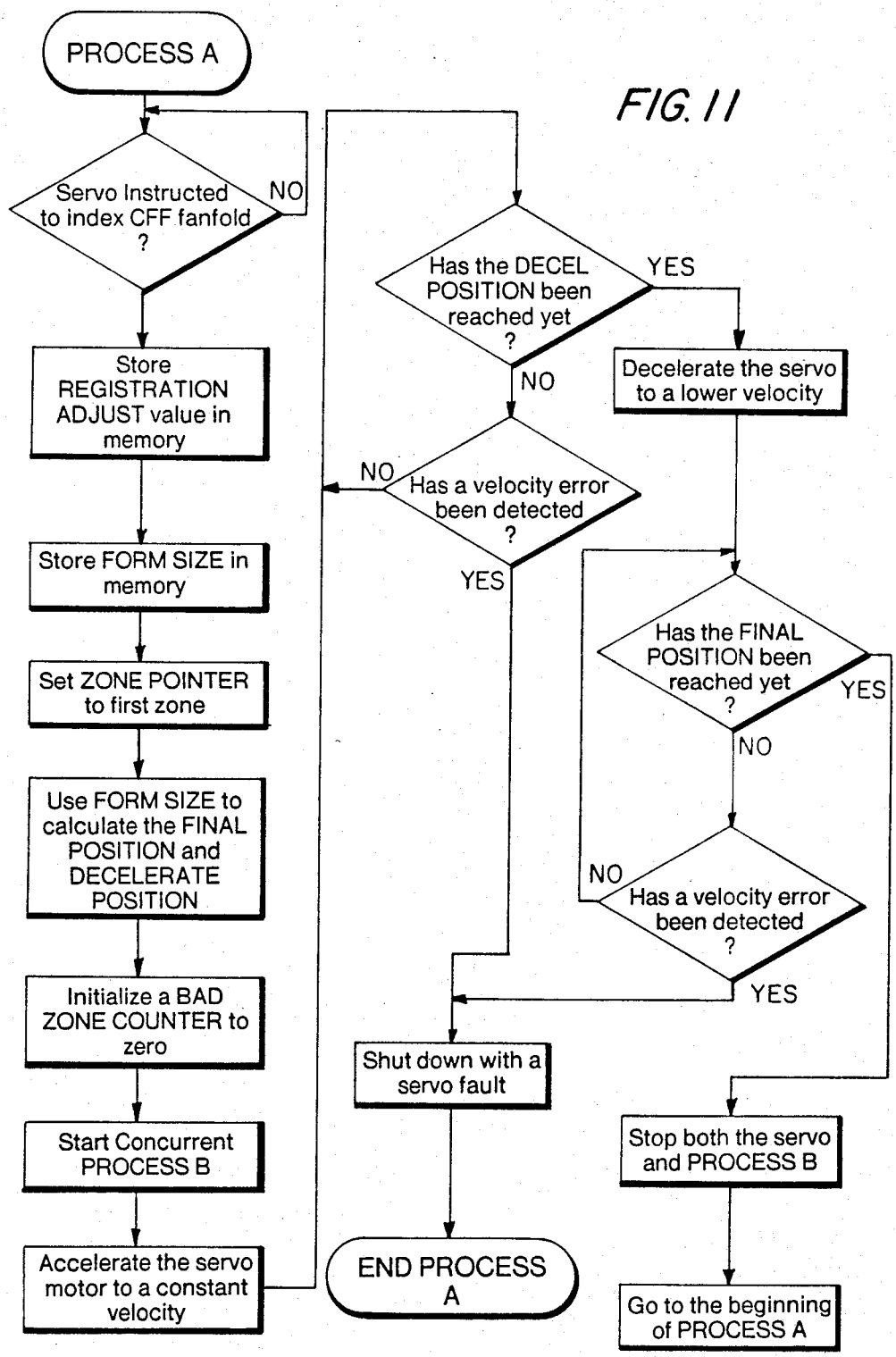
FIGS. 11-13 are exemplary flow charts of said control functions.

The exemplary document handling system disclosed in FIGS. 1-13 may be conventional except as otherwise described herein, and may be mounted to any suitable or conventional copier. Disclosed here is a semi-automatic over-platen document sheet handler (SADH) 10 for conventional copier platen copying, but in which either CF web, or a conventional set of document sheets fed seriatim manually or automatically from a stack thereof, is automatically fed out onto the copier platen, registered (including deskewing) and then copied and then automatically removed (ejected) from the platen.

This document handler 10 feeds a series or mixture of individual sheets or CF webs to the copier platen with the same, non-sprocket, document feeder apparatus and without any operator changes, i.e. automatically switching in operation and function from an SADH mode to a CFF mode based only on which type of document material is fed in. The lead portion of the CF web is automatically self-threaded and fed into registration after the lead edge is initially inserted at the input (without requiring any other operator action) and automatically registered at the same raised registration edge position (on the platen downstream edge) used for regular document sheets. An oversize document trail edge sensor at the document input tells the unit 10 it is being fed a web rather than a cut sheet. It then switches automatically to the holesensing computer forms feeding (CFF) mode. When said trail edge sensor and a CF hole sensor tells the unit 10 it has been fed CF web this registration gate automatically is held down as the entire CF web is incrementally fed through and the input pre-registration gate and feed rollers also remain open. In contrast, if a regular size individual document is fed, both the registration and pre-registration gates close to register the next and each subsequent document sheet. The registration control for CF web incrementing also here includes compensating logic for unpunched, mispunched or torn away edge sprocket holes in the CF web, and for web feeding slip, which substantially improves registration reliability and accuracy.

Computer fan-fold web is fed in the dual-mode (SADH/CFF) unit 10 by the same non-sprocket (non-tractor) frictional drive which is used for single sheets. The control of the incremental feeding into registration of the subsequent selected individual segments of the CF web utilizes validating and counting of the web's sprocket holes with a photosensor system and controlling each incremental advance of the web therewith with said servo drive frictional feeder. This feeder is fully compatible with feeding unpunched paper. All documents including the CF web are both fed and edge registered over the platen using a frictional drive including a simple non-critical "ski" assisted angled "scuffer wheel". The CF edge holes are used only for the hole counting sensor and logic control of the forward (downstream) feeding direction movement of the CF web in selected increments by this same scuffer wheel drive together with frictional drive output rollers. This frictional drive tracks and maintains top edge registration of the CF web through the document transport path without requiring any sprocket drive. It is servo driven by incremental amounts in a controlled manner to increment the CF web. This same scuffer wheel feeder also fully compatibly feeds and registers individual document sheets by being driven for appropriate different time periods.

Expressing it another way, the disclosed semi-automatic document handler computer forms feeder (SADH/CFF) 10 is a simple integral unit conventionally pivotally mountable to the top of a conventional copier processor, but provides two major functions with common components. In the SADH mode it accepts single sheet documents inserted into its input station or tray, transports these documents onto the platen glass, and corner registers them for copying. After the desired number of copies are made by the processor the SADH removes the document sheet from the platen and stacks it in a catch tray on the left side of the machine. This process is repeated until all of the documents are copied. In the alternative CFF mode, the CF web fan-fold stack is placed here on top of the processor to the right of the SADH/CF input. The first sheet or page of the CF web is inserted in the document handler similarly to any single sheet document. The nominal user will not perceive any difference or need to make any changes or adjustments. When the copier "START PRINT" button is pressed, this first CF page is automatically fed in the SADH operating mode and registered in the SADH mode over the platen with the same apparatus used for individual documents, and copied. The CF web's excessive length (greater than that of an acceptable individual sheet document) is sensed at the input area. Upon feedout of the first web segment the document handler 10 automatically confirms the presence of sprocket hole CF and automatically begins to index the web for subsequent CF page copying. The amount (distance) of incrementing or indexing may be pre-programmed to a nominal conventional CF segment (e.g. 22 sprocket holes or eleven inches [28 cm]), with an over-ride or adjustment programmable by the operator to select smaller or larger CF web segments to be incremented. The ejected CF web may be conventionally stacked after copying in a conventional wire-form basket attached to the left end of the copier.

The system is completely self-threading and self-registering regardless of the type of document inserted in the unit 10. The unit 10 basically treats the initial segment of a CF web as if it were an individual sheet document and therefore does not need to know at that point whether or not it is a CF web. That information is needed only for the second and subsequent CF web segments with this system, by which time the system has automatically determined that the document is oversized and has valid sprocket holes, and has automatically switched to a CFF mode.

Regardless of the type of document being fed i.e. whether it is CF web or any size of individual document sheet, it may be fed into the same input here, i.e. input tray 12. Two slightly different inside edge lateral pre-registration alignment edges 13 and 13a may be provided in the tray 12, one for regular documents and one for the CF web, with the CF web pre-alignment edge 13a being more closely aligned with the lateral registration edge 30 on the platen 20 and higher. The lead edge of either type of document is inserted on the input tray 12 through the open nip between driven input rollers 14 and underlying idler rollers 16 until the lead edge of the document is generally aligned with input or pre-registration gate fingers 18. All these components are upstream of the platen 20. When the lead edge of the document, regardless of type, is so inserted, with its inside edge against the pre-alignment edge 13 or 13a of the tray 12, an upstream or document input switch 22 is actuated. The switch 22 preferably comprises a lightweight opaque mechanical finger or flag which, when pushed up by the document lead edge, interrupts a conventional light beam/photodetector switch. Thus, a basically non-mechanical switch is provided, but unlike a conventional photodetector switch, the switch 22 will respond to the presence of a transparent or apertured document.

Referring particularly to FIG. 9, once the switch 22 is actuated, and the copier is in an actuated or "START-PRINT" mode, an initial feeding cycle is initiated by the unit 10 controller 100. This initial or feed-in cycle is the same regardless of the type of document inserted into the device, and does not require any operator manipulation or switching. The two overlying input rolls 14 come down to close their nip and are driven and the gate fingers 18 are lifted up to open the pre-registration gate, all by driving a simple AC motor M1 in a forward direction through appropriate or conventional drive and cam mechanisms comprising part of a drive system 24. An overlying platen clamp 26 has been previously lifted through cams 32 and 34 (see FIG. 1 as well as FIGS. 6 and 7) by another part of the same drive system 24 to provide a space over the platen 20 for the low-friction feeding of the document thereon. The document, regardless of type, is fed in onto the platen by the rolls 14. The lead edge of the document then engages an on-platen scuffer roller 28 driven by a d.c. servo motor M2. The roller 28 is spaced from, but relatively close to, the lateral registration edge 30 of the platen, and is mounted so as to be rotatively driven at a slight angle theretoward, e.g. approximately 7°. Thus, the scuffer roller 28 primarily continues to drive (pull) the document forward but also frictionally urges the document laterally (sideways) into (toward) lateral engagement with the lateral registration edge 30. If the document is of normal size, its trail edge exits the input rollers 14 and comes under the sole control of the roller 28 at this point. If it is a CF web it remains in the nip of rollers 14 which continue to rotate for a total fixed feeding distance sufficient for the lead edge of the CF web to reach the position of the registration edge, and then the roller 14 nip cams open and the motor M1 is switched off, automatically, in both cases.

This lateral registration edge 30 is, as shown in FIG. 8, preferably slightly undercut to trap and provide a confining channel for the document edge to prevent the document edge from being laterally driven beyond the edge 30 but allow unobstructed movement of the document in its downstream or primary feeding direction across the platen. To assist this, the platen clamp 26 here is deliberately not lifted uniformly. Rather, as illustrated in FIG. 8 and by the difference in diameters of the lifting cams 32 and 34 of FIGS. 6 and 7 respectively, the lifting of the planar document clamp 26 is only very slight directly adjacent the lateral registration edge 30, (or none) to prevent the document edge from riding over or escaping that edge 30. However, the remainder of the clamp 26 is lifted much higher, i.e. much further away from the platen, by the larger lift cam 34 acting further away from the registration edge 30. Thus this non-planar lifting of the platen clamp 26 provides an overall low friction passageway for the document thereunder, but maintains close control over the side edge of the document being registered in the immediate area of the lateral registration edge 30.

The lead edge of a document driven further downstream across the platen under the driving of the scuffer roller 28 is driven into abutment and alignment with the registration fingers 42 of a document lead edge registration system 40 along the downstream edge of the platen 20, which fingers 42 are raised by a solenoid at this point in time into the document path. In this movement the document passes under a kickoff or ejecting roller 36 which is lifted up out of the way at this point by its solenoid 46. A sufficient time is provided by the controller 100 for the document lead edge to reach and be driven into registration against the raised downstream registration fingers 42 from the time the system 10 is started, i.e. from the start of said feed-in cycle.

The upstream or input switch 22 meanwhile continues to be interrogated by the controller 100. If the trail edge of the document passes the switch 22 too soon after the lead edge, the system thereby senses an undersized (too small) document to be properly handled, i.e. a document whose dimension in the feeding direction is less than the distance between input rolls 14 and the scuffer roller 28, and shuts down the system, i.e. provides a jam or improper document signal. If the detected document is an individual sheet and its length is appropriate, i.e. if a document trail edge is sensed by the timely pasage of the end of the document past the switch 22, then the document handling untit 10 automatically, through its controller 100, remains in an SADH or individual single document mode of operation. If, on the other hand, switch 22 is still activated at the time the lead edge of the document is registered over the platen for copying against the downstream registration gate unit 40, i.e. no appropriate document sheet trail edge is sensed, then continued actuation of switch 22 indicates the presence of a web input and automatically causes the document handler unit 10 to switch to a CF web mode of operation. (If a CFF mode of operation were not available, the switch 22 then would then instead be utilized as an over-size document or jam indicator to shut down the unit 10.)

At this point, the individual document sheet, or initial segment or frame of the CF web, whichever is the case, is properly corner registered over the platen 20 against both the downstream registration edge 42 and the lateral registration edge 30, and the document is ready to be copied. The motor M1 has then automatically through its drive system 24, relifted the document input feed rolls 14 and released the input gate fingers 18. If no document is present there the fingers 18 will drop with gravity into their initial pre-registration gate position. However if a CF web is present, extending through the input area, the fingers 18 will simply come to rest with a slight gravitational force on the document web without damaging it. Preferably the outboard finger 18a is slightly longer so as to be the only one in actual contact with the CF web and normally holding the remainder of the gate finger unit, i.e. all of the other fingers 18, out of contact with the CF web.

At this time (afer registration) the motor M1 is driven in the opposite direction to accomplish additional functions. These include the lowering of the platen clamp 26 by rotation of cams 32 and 34 and by its spring mounting so that the clamp 26 presses the document flat against the document for copying. (The frictional slippage force of scuffer wheel 28 against the document backside initially helps hold it in its registration position before the clamp comes down.) This same mechanism 24 driven by motor M1 also rotates a cammed shutter system 44 through the linkage mechanism particularly illusrated in FIG. 1, to close white optical shutters over the apertures in platen clamp 26 through which both the scuffer roller 28 and kickoff or ejecting roller 36 were extended for their operation. Meanwhile these rollers 28 and 36 have both been lifted up above the platen clamp 26 and platen 20 by the mechanism 24 as illustrated in FIGS. 1, 2, 3, 4 and 5 and schematically illustrated in FIG. 8. (The lifting of the kickoff roller 36 here is also controlled by a solenoid 46.) Note that the raising and lowering (engagement) of the feeder roller 28 is by motor M1, but its driving (rotation) is by servo motor M2. The document is then conventionally copied, preferably rapidly by flash illumination.

Continued (additional) driving of the mechanism 24 with the same reverse direction of the motor M1 then reverses the above operations, i.e. lifts the platen clamp 26, opens the wheel shutters, and now drops the kickoff roller 36 (except in the CFF mode) and the scuffer roller 28 into engagement with the document sheet. Meanwhile the registration fingers 42 are dropped down out of the document path by deactuation of the solenoid for the lead edge registration system 40. Both the rollers 28 and 36 are now driven in a high speed document ejecting mode by their connecting servo motor M2. The lifting of clamp 26 (and the prior lifting of the rolls 14) can be confirmed within an appropriate allotted time period by actuation of positional switches therefor as illustrated in FIG. 9. These switch actuations may also be used to stop motor M1 upon each completion of each desired movement.

Only if the unit 10 remains in its SADH mode afer this first page copying will the previously described input system next be operated again by driving the motor M1 in its forward direction for lowering rollers 14 and rotating them to feed in the next individual document sheet. If the unit 10 is now in its CF mode this is not done, and the input rolls 14 nip and the gate fingers 18 remain open for the entire remainder of the web to allow the (connecting) upstream portions of the CF web to be fed onto the platen without using rollers 14, as further described herein.

Returning to the operation as the document lead edge is being driven off of the platen 20, it is fed into the nip of directly adjacent downstream takeaway rollers 50, driven by motor M2. Also in this ejection movement the lateral edge area of the document passes through a photooptical CF hole detector sensor or switch 52. The switch 52 is aligned relative to the lateral registration edge 30 on the platen so that when a CF web is aligned against said edge 30, then, as it is fed off, the sprocket holes along that one edge of the CF web will be centrally aligned with said CF switch 52. Sensor 52 is connected to the controller 100 and, as discussed hereinbelow, is compared with data stored therein and the measured feeding movement of the document feeder drive, to determine the appropriate time intervals at which proper (valid) CF sprocket holes will pass under and actuate the CF switch 52. Since the one-half inch standard distance between CF holes is known, and the standard size of the CF sprocket holes is known, and the actuating times and numbers of actuations of the switch 52 by sprocket holes become known as the web passes it, and the position of switch 52 is known and constant, and the motor M2 CF web drive movement is known (and servo controlled) the identification and position of the CF web can be controlled and registered using constant data references and simple conventional clock countdown memory counts in the controller 100, as further described hereinbelow. No unconventional circuitry is required.

If CF web has been fed into the unit 10, the CF detector switch 52 and the controller 100 will determine whether or not it is in fact CF web by detecting, after the first copy or copies have been made from the first (mechanically registered) portion thereof, the presence of valid (proper size) CF sprocket holes and valid (proper distance) spacings between CF sprocket holes. Once this initial CF web determination has been made, the system 10 will continue in its CFF operating mode to automatically incrementally feed the CF web for copying at selected incremental length portions thereof, as will be further described herein until the entire web has been fed through. If, on the other hand, the CF detector 52 and the controller 100 do not find in this initial feed that CF web has been fed (e.g. by switch 52 providing a steadystate signal) then a jam indication will be provided instead (indicative of a misfeed, or an oversize but non-CF document, etc.). The system will automatically return from its CFF mode to its SADH mode after the CF web end is detected by switch 22 and the remaining web has been copied and ejected.

Referring further to the feeding and registration of the document by the scuffer roller 28, this is substantially assisted by this roller 28 extending through a separate, "skid" or "ski" portion 27 of the clamp 26. "Ski" 27 is an independently mounted, gravity loaded, planar member comprising a rectangular downstream/lateral edge corner portion of the overall clamp 26. This ski 27 "floats" on, and helps confine and prevent buckling of, the portion of the document being fed into registration by the scuffer wheel 28, utilizing the ski's weight and closeness to the platen. The clamp 26 is otherwise preferably a generally planar optically uniform light reflective surface. As shown in FIG. 3, the ski 27 is preferably pivotably mounted at or adjacent its upstream edge to the clamp 26 so as to be inclinable downwardly toward the downstream registration edge fingers 42 even when the remainder of the clamp 26 is lifted for document feeding thereunder. The downstream lip of the ski 27, directly adjacent the registration edge, may also curve slightly toward the platen to concentrate its hold-down effect there (and help prevent the document lead edge from being driven over registration fingers 42) and to reduce friction upstream thereof with ski 27. The area of the ski 27 is limited to be smaller than (inside that of) the smallest standard document to be copied so as not to copy any "show-around" shadows from the intersections or separations between the ski 27 and the rest of the clamp 26. This is assisted by appropriately rounding off or contouring the edges of the ski 27 and the clamp 26. I.e. their edges are appropriately contoured to reduce edge shadows which might otherwise print out ("show-through" the document) on the copy sheet as dark lines.

Returning further to the take-away rollers 50, it may be seen that these comprise a plurality of driven rollers overlying corresponding idlers to provide a frictional pinch or nip drive. Once the rollers 50 acquire the CF web they become its primary feeding force for all subsequent web movement. The two inboard (nearest the lateral registration edge 30) rollers 50 are slightly larger than the other rollers, e.g. approximately one half millimeter larger in diameter. This provides a computer forms feeding mechanism downstream of the platen which also applies a rotational force to the CF web urging the upstream portion of the CF web against the lateral registration edge 30 in cooperation with the driven scuffer roller 28 which is simultaneously and cooperatively frictionally laterally urging the same CF web against the same registration edge 30. These takeaway rollers 50 are all commonly aligned on the same shaft, which is directly perpendicular the line of the lateral registration edge 30. Expressing it another way, this difference in roller 50 diameters causes a rotational couple on the CF web causing the upstream portion thereof to be rotated or twisted (i.e. providing a skewing force thereon) against the registration edge 30 and input edge guide 13a. Special lateral registration assistance is important for CF web because the length and mass thereof would make the maintenance of proper lateral registration of the CF web for its entire feeding very difficult for a single over-platen mechanism such as the scuffer wheel system 28 itself. The rollers 50 are driven by the same motor M2 at substantially the same feeding speed (approximately 1% faster) as wheel 28. The roller 50 nips are maintained closed throughout all of the feeding cycles, but may be manually opened for jam clearance.

If the document handler 10 is in the SADH or single individual document mode of operation, then the downstream or platen registration fingers 42 are intermittently lifted up into the document path after the trail edge of each document has been removed from the platen by the takeaway rollers 50, for positive mechanical registration of the next document's lead edge. However, whenever the document handler 10 is in the CF mode, the registration fingers 42 remain down continuously, out of the document path, for the feeding of the entire CF web. Thus all individual document sheets are desirably mechanically registered on the platen with a mechanical edge registration system 40, whereas this system is automatically disabled for all CF web segments after the first segment, where it would be inappropriate and would damage the web.

Referring further to the kick-off or ejecting roller 36, its function is only to insure that any size of individual document, or (only) the lead edge of a CF web, is positively fed from the registration edge 42 into the nip of the take-away rollers 50. It is thus driven only for a brief preset time to accomplish this, and so as not to normally ever run against the bare platen glass. In the CFF mode the operation of solenoid 46 only allows the kick-off roller 36 to lower for the first CF web segment feed-out, i.e. only for the feeding of the initial (lead edge) web into the rollers 50 nip segment, but not for any subsequent CF web feeding. In the SADH mode it is dropped and operated briefly for each document sheet ejection. This is another distinction between the SADH and CFF modes of operation. The kick-off roller 36 has a higher normal force than the scuffer roller 28 to insure that the first CF web segment is pulled into the nip of rollers 50 even if there is considerable upstream web feeding resistance.

The subsequent portions or segments of the CF web to be copied are automatically incrementally fed and registered in the CF mode by an entirely different mode of operation from the SADH mode. The CF mode of operation utilizes verification and counting of sprocket holes and servo controlled incremental feeding of the CF web with said hole verification and counting information. The CFF mode automatically feeds the selected web increment by rotating the servo motor M2 until the appropriate portion (preselected length) of CF web has been fed by rollers 50 and then stopping the web by dynamic braking of the motor M2 at the electrically calculated registration position, copying that web segment, and repeating these steps until all of the CF web has been so incrementally fed and copied. Any desired length of web may be fed in each incremental movement simply by setting an operator control switch therefor for the controller 100. Thus the CF web feeding is not limited to feeding only single increments between burst lines of the CF web. However, as indicated above, the controller 100 may be automatically preconditioned to feed, for example, a standard 22 sprocket hole CF web length per increment in the absence of any different operator input. The number of sprocket holes passing the switch 52 and counted thereby is compared with the number desired to be fed to provide the appropriate incrementing distance, utilizing a slip-compensating registration accuracy improvement and hole validation system described hereinbelow.

Considering now the further details of this system when directed to do such a computer fanfold index, the exemplary intelligent servo CF web incrementing drive system provided for this CFF mode of operation will be discussed. As indicated above, even for CFF copying the first fanfold segment to be copied will be fed to a raised mechanical registration gate 42 position as if it were an SADH mode original. From this point on however, registration now becomes the responsibility of the servo system. An incremental digital encoder encased within the servo motor M2 is used to monitor the motor M2 amount of rotation. This may be a simple conventional pulse generator providing a known number of pulses per increment of revolution of motor M2. The fanfold (CF web) edge holes are meanwhile also monitored, using the sensor 52 located downstream from the registration position. This CF web position feedback from the sensor 52 is used to monitor the actual fanfold position throughout the course of an index (each incremental CF web movement). By using this combination of document transport motor M2 encoder feedback and document position feedback, the velocity and position of the fanfold may be accurately controlled by the servo system software. This compensation technique can offset the tolerances and variations of the web drive rolls 50 and 28 and even account for a considerable and variable amount of web driving slip, as explained hereinbelow.

In the CFF mode, the desired web stopping location for each web increment is dependent on the selected web increment or index length, which is a constant preset before attempting a feed. Since this information establishes a relative stopping location, the CFF routine subtracts fixed predetermined distances from this value to establish the points of interest for each incremental feed. This is basically accomplished by counting down the number of detected sprocket holes against the known and preset constant number of such holes in the web increment selected, e.g. 22. However, as described later below, the web distances for uncountable missing or plugged holes are counted or compensated for also in this system (as long as there are not more than three uncounted sprocket holes in a row).

The servo motor M2, and therefore its connected web feeding rollers 50 and 28, is driven in a programmed controlled velocity manner throughout each web incrementing step. The web is rapidly initially accelerated in a controlled acceleration up to an adjusted nominally constant speed plateau for most of the web segment movement. As the end of the web increment approaches, the web feeding system is rapidly decelerated from its major web incrementing velocity to a much lower step velocity level by partially dynamically braking the motor M2. Shortly thereafter the system begins to monitor for its final web stopping position while the web is moving at this lower constant velocity. The final stopping position depends on the hole compensation routine, the registration adjust value and the document length value, which are preferably stored in non-volatile memory. Once the stopping (registration) position is reached, the system is dynamically braked and comes to rest, waiting for its further commands. The document clamp 26 is lowered by motor M1 and the selected number of exposures is made of that registered CF web segment.

Since some of the sprocket holes in CF web occasionally are unpunched or plugged up, or otherwise not present, or interjected or distorted with tears or clinch marks, or are in a torn-away or dog-eared area of the CF web, an intelligent CFF system is desirably sophisticated enough to recognize these potential registration error conditions and still continue to perform the desired feeding function and properly register the fanfold. The disclosed system will do so under most such circumstances, even though the CF web is not driven and registered by any sort of conventional rigid and non-slip sprocket hole drive scheme. The present system cannot depend on a sprocket drive mechanism for registration accuracy.

Referring to clinch marks, some business forms are fed by a clincher drive which can punch additional holes known as clinch marks in the areas between sprocket holes of a CF web. As discussed below, such clinch marks seriously complicate relying on optically detecting and counting sprocket holes.

With the present system the CF web or fanfold is driven by nonsprocket feeding means (a frictional or pinch roll drive) and the holes in the fanfold are relied upon for positional information. Thus, compensation for slip of the frictional drive mechanism as well as compensation for hole defects is needed for an effective system, even with a micro-processor controlled DC servo drive motor with a position encoder.

This web positional technique, using a sensor to detect the sprocket holes in the fanfold, is dependent on the servo system's ability to both properly detect and validate sprocket holes. Hole validation is accomplished here in part by counting (accumulating) the motor M2 encoder position pulses from the time when the lead edge of what appears to be a sprocket hole has been detected by sensor 52 until the end of that same hole passes the sensor 52. If the end of the space (trail edge of the hole) is detected within an appropriate preset maximum number of motor encoder position pulses from the detection of the beginning of the space (the lead edge of the hole) corresponding to the largest standard sprocket hole diameter, plus an allowance for sensor and tracking tolerance, then it may be assumed to be a valid space or hole, and counted, providing it also is meeting other (parallel) validating criteria discussed below. Note that the first and last holes in a standard CF web segment (adjacent the perfs) are normally slightly larger than the other sprocket holes. A minimum pulse count to validate a hole may also be set in addition to said maximum count. This minimum will be smaller than the count for the smallest standard sprocket hole, i.e. also minus an allowance for accommodating lateral hole misregistration and other tolerances. However, it will reject (invalidate) small tears or clinch marks, burst line cuts (perfs), staple holes, etc. The counting of encoder pulses and the validating of holes, etc., is performed logically, either by conventional discrete IC's or preferably by the conventional copier microprocessor in real time. Once a sprocket hole has been validated, the "high to low" transition signal output of sensor 52 when a validated hole trail edge is fed past the sensor (as opposed to a "low to high" signal from the hole lead edge) may be used to initiate subsequent logic steps as described herein. The sensor 52 itself preferably has dual parallel IR beams about 0.11 inches (3 mm) apart traverse the web feeding direction with dual photodetectors connected to a common "OR" output, so as to compensate for some lateral misregistration of the web holes relative to the sensor position without losing "sight" of the holes or "seeing" too small a hole by seeing a chord of the side of the hole rather than its full diameter.

Returning now to the CF web registration system, a substantial (but not unlimited) amount of web feeding slip (about 0.275 inches or 7 mm per sprocket hole) may be fully compensated for by the technique described hereinbelow. If a document increment is assumed to be a fixed length, then that length may be nominally represented by an equivalent fixed number of motor M2 encoder position pulses, as if there were no slip. If the CF web document is divided up into imaginary spaces or zones of equal distance about each hold, then at any given instant one could say that each hole falls within its own space or zone. (See FIG. 10 and its further description hereinbelow.) Each said zone, being an actual and nominally constant distance, can be nominally equated to a given number of drive motor encoder pulses (e.g. 250 pulses per zone). Thus as long as a CF sprocket hole is detected by sensor 52 somewhere within its own assigned zone, the servo software will know where the document web actually is then with respect to where its servo drive thinks the web is, in terms of a pulse count, and is therefore in a position to intelligently compensate for slip. That is, when the trail edge of such a validated hole is detected the servo system knows how far the web actually is from that hole to registration, as well as where that hole is within its assigned zone.

As noted, the zones are established using the encoder on the motor M2 to count $\frac{1}{2}$ inch increments of anticipated web hole displacement, in a zone counter, but the web holes are actually detected by a sensor 52 downstream from registration. Thus, any web feeding slip always means that the actual document web position at the sensor 52 always lags the position feedback indication from the encoder on the web drive motor M2. Thus the web hole, if present, will always be found by the sensor 52 apparently drifting back upstream (opposite to the web motion direction) proportionally to the amount of slip. Thus, to take advantage of the above-described zone concept to maximize compensation for any slip, the nominal zone boundary is set or established in the zone counter so that the zone starts just before the anticipated hole and ends very close to the next hole under normal (non-slip) conditions. Thus, the hole has a larger "window" of slip distance within its zone in which it may be detected if slip occurs. I.e. a greater tolerable slip within each zone is provided, as calculated below.

Since each zone or hole pitch is equal to the $\frac{1}{2}$ inch distance between holes, that value $D_z = 0.50$ inches. The nominal hole diameter ($D_{hole}$) is 0.150 inches. $D_{lead}$ is selected to be 0.075 inches, where $D_{lead}$ is the distance the start of zone boundary is set ahead of the lead edge of the hole. $D_{slip}$ (the maximum detectable slip) is the distance from the trail edge of the hole to the trail end of the zone calculated as follows: $D_{slip} = D_z - D_{hole} - D_{lead} = 0.50 - 0.150 - 0.075 = 0.275$ inches (7 mm).

Thus the worst case value of detectable slip in one zone would exist if the hole was detected as having slipped back to the upstream end of the entire $D_{slip}$ distance within that zone, i.e. if the web has slipped no more than 0.275 inches (7 mm) relative to the drive encoder pulse count in one hole pitch.

Note that after this worst case slip that all subsequent holes including the next hole have now also slipped by an equal amount, since the entire web increment slips and since the spacing between holes in the web itself is always a constant 0.50 inches. The subsequent holes will have slipped into the worst possible position within each zone to allow for detectable slip in that zone if the original zone boundaries were maintained. To compensate for this problem, the zone boundaries are automatically adjusted, i.e. reset or changed, from when and where a valid but slipped hole is detected. The next zone boundary is reset to a new position in the zone counter such that the next hole will have the full 0.275 inches of slip zone in which to be detected. $D_{comp}$ is a constant (fixed) value which, after each valid hole detection, is used to change the original zone boundary position to the new zone boundary. The new boundary is appropriately spaced by $D_{comp}$ from the last detected hole trail edge position rather than from the previous zone boundary. Thus it automatically compensates for any amount of slip less than $D_{slip}$. $D_{comp}$ is always $0.50 - 0.150 - 0.075 = 0.275$ inches (7 mm). However, where there is no valid hole detected anywhere within a zone, the zone boundary for the next hole is not so reset, rather it is fixed at 0.5 inches from the prior zone boundary (with a limit of 3 zones, as discussed infra) by the zone counter having automatically reset at the end of a full zone count. However, the next zone boundary is from the preceding zone boundary (by the zone counter recycling at a full zone count) only in the case where no valid hole is detected in the zone. If a valid hole is detected (as it normally is) then the next zone boundary is reset from that detected hole position irregardless of the previous zone boundary position.

In further explanation, referring to FIG. 10, a segment of CF web is shown being fed past sensor 52 in its feeding direction (the movement arrow). The initial zone boundary is the dot-dashed vertical line at the left hand side. The solid line circles are the initial positions of the sprocket holes. A slippage in the observed web movement (relative to the web feed) is shown in the initial zone here (such slippage could be in any zone, but for clarity here is limited to one zone). This is a detectable slip because the amount of hole slip is within one zone, i.e. a valid hole is detected within that zone even though it is found not where it was anticipated (near the beginning of the zone), but rather near the end of the initial zone. Because of this slippage the actual sprocket hole position detected in said first zone by sensor 52 is shown by the dashed-line sprocket hole position there. Since the web is moving integrally this same slippage occurs in all the upstream zones, as shown by the other dashed-line sprocket holes in those zones. To compensate for this slippage, the next zone boundaries are automatically repositioned to 0.075 inch in front of the new (dashed-line) hole positions. These new zone boundaries are shown as dashed vertical lines. That is, once the trail edge position of the slipped hole is detected, the anticipated distance in encoder pulse counts to the next anticipated hole (absent further slip) is a known constant and therefore the next zone boundary can be reset to slightly ahead of the lead edge of the next anticipated hole. This can be accomplished by immediately resetting the zone counter with a pulse count equal to 0.5-0.275 inches or 0.225 inches (5.7 mm) at the instant the trail edge of any valid hole (slipped or not) is detected and then allowing the zone counter to continue its normal upward count (i.e. accumulating pulse counts from the motor encoder). I.e. the zone counter thus is reset or reinitialized by the hole detection signal to a new fixed count level, e.g. 112 pulses for a 250 pulse zone. The allowed distance to the next desired reset zone boundary is thus 138 pulses. The reset zone counter will now accumulate 138 more pulses from the rotation of the encoder (added to the 112 pulses) until the end of zone pulse count (250 here) is reached. Since, as noted elsewhere, only one valid hole is counted in each zone and one has already been detected in this zone, there is only one such zone boundary reset allowed in each zone.

The final or registration web position may be calculated as follows: After each first valid hole is detected the zone in which it was detected provides a pointer to a conventionally provided table in software which contains the number of drive motor encoder pulses that would be added to the present position to create a total number of motor encoder pulses that need to be displaced before stopping the motor and registering the document, I.e. a total count to perf, if the perf line is the registration position desired, as it often is. With this technique, each valid hole that is detected within its zone provides the system with the best (and updated) interpretation of the web distance that remains to be traveled. That is, each validated and detected hole establishes the actual web position at that time and therefore a known remaining count to the registration position.

Referring further to the hole validation routine, web tears as well as unpunched holes are deliberately neglected by the controller, as discussed above, and further discussed below. Clinch marks are also normally neglected (i.e. do not normally prevent proper registration). This hole validation is greatly assisted by where the zone boundary is reset relative to a valid hole as described above. The zone boundary system is set so that normally (absent slip) a valid hole is detected right away (at the beginning of the zone), unless there is an unperforated or clogged sprocket hole. Further, once one valid hole is detected within one zone no additional valid holes are allowed to be considered in the same zone by the controller. Thus, all clinch marks or any other spaces occurring between (after) detected sprocket holes will be automatically ignored even if they were of a valid size. In the unlikely event that the first valid space detected within a zone is a tear or clinch mark having a valid hole dimension range, rather than a sprocket hole, then there could be a potential for misregistration. However, that invalid hole problem will be corrected-for as long as at least one more valid hole is detected within its appropriate zone in at least one more zone before the document is stopped. If the last hole detected in the web increment is a valid-sized clinch mark then there can be a misregistration, but of less than 0.5 inches. Even in that case it is possible that the next web segment index (incremented feed) may straighten out the misregistration automatically.

To express this hole validation another way, all tear or clinch marks or any other non-sprocket web apertures are automatically rejected or compensated for by this system except for a very rare (triple coincidence) situation of a non-sprocket aperture having a valid dimension and being sensed before a valid hole is sensed in that same zone, and where there are no more valid holes sensed in any subsequent zones before the last zone.

The software is preferably also set to allow continued web feed or attempted web feed of a maximum of three zones in sequence without detecting any valid holes before declaring a misregistration fault. This compensates for up to three torn out, unpunched, or clogged sprocket holes in a row without requiring shutdown, and without losing registration unless there is excessive slip during those three zones of travel. Thus, all valid holes detected, plus all hole zones in which no valid holes are detected, if not more than three in a row, are subtracted from the preselected and stored total hole count in the web increment needed to reach the preselected registration position for that increment. To express it another way, even if no valid hole is detected in a zone the web continues to be driven at the same speed, and fixed zone boundaries are maintained, i.e. it is assumed that the web is moving at the driving speed, unless three such consecutive zones have accumulated in a row with no valid holes being detected in any of the three zones.

The location of the hole sensor 52 is not especially critical, because of the compensation described. The sensor should, however, preferably be located so that it is in a desired zone boundary or $D_{lead}$ position, i.e. 0.075 inches downstream (ahead of) a hole lead edge when the web is properly registered. Note that a perf (CF web segment burst line) is conventionally exactly half way between two holes. Also normally the desired registration (stopping) position for a CF web is with a perf line at the registration edge. These $D_{lead}$ positions exist at every 0.5 inch interval. This means that the sensor 52 may be located at any such position downstream from registration and downstream from the CF driving nips of takeaway rolls 50, as long as the sensor is close enough to the web feed wheel 28 to accommodate the shortest fanfold web to be fed therebetween. The farther the sensor 52 is located from a desired $D_{lead}$ position the less slip that can be tolerated (detected) and, as noted, conditions may thus arise in which a hole can be missed by its having slipped into the next zone. In that case, an immediate ½ inch of registration error can be induced in the first zone which cannot be detected and requires operator intervention for recovery (but will not stop the web feeding).

The web feed servo M2 is preferably controlled to run at a constant velocity once its initial acceleration is completed, as previously discussed. Velocity control may be effected by varying the applied voltage across the motor leads to vary and maintain the speed of the motor. This is possible where the speed of the motor varies linearly with the applied voltage. Rather than using a linear voltage amplifier, the applied terminal voltage may be rapidly varied by turning on and off the full power supply voltage. The ratio of on to off time determines the average voltage that the motor sees during that time. This technique is known as pulse width modulation (PWM). A PWM frequency for this servo of 3000 Hz corresponds to a period of 333 microseconds. The velocity may be controlled by adjusting the duty cycle within the 333 microsecond period with a resolution of 10 microseconds. To determine the speed of the motor, the servo controller samples the encoder pulse output over the course of a 5.461 milliseconds period, and based on that informatio calculates a new PWM duty cycle for the next period. The sampled position information is compared against a constant which is representative of the desired velocity.

Fixed time period actuations of the servo motor M2 to its constant speed drive are used as the input (beginning) and output (end of cycle) operations in both the CFF and SADH operating modes. In both modes the motor M2 may be driven for approximately 500 milliseconds to feed in a sheet or initial CF web segment. At the end of a CF web, or after copying an individual document, the motor M2 may be run for another 500 milliseconds or so for ejection from the platen. In the case of a CF web one additional CF web increment may be provided in addition to the time period to insure clearance of the end of the web from the exit rollers 50. In these non-critical feeds the motor M2 can be simply allowed to coast to an uncontrolled stopping position from its feeding speed.

It should be noted that while a d.c. servo motor drive with an integral shaft encoder is preferred, it is not required, as long as rotational information on the web drive is available. For example, the motor M2 could be a braked a.c. motor, providing it can provide stopping accuracy. The rotational information could be provided by a pulse generator on the shaft of the rollers 50, or the like.

Figure 12:
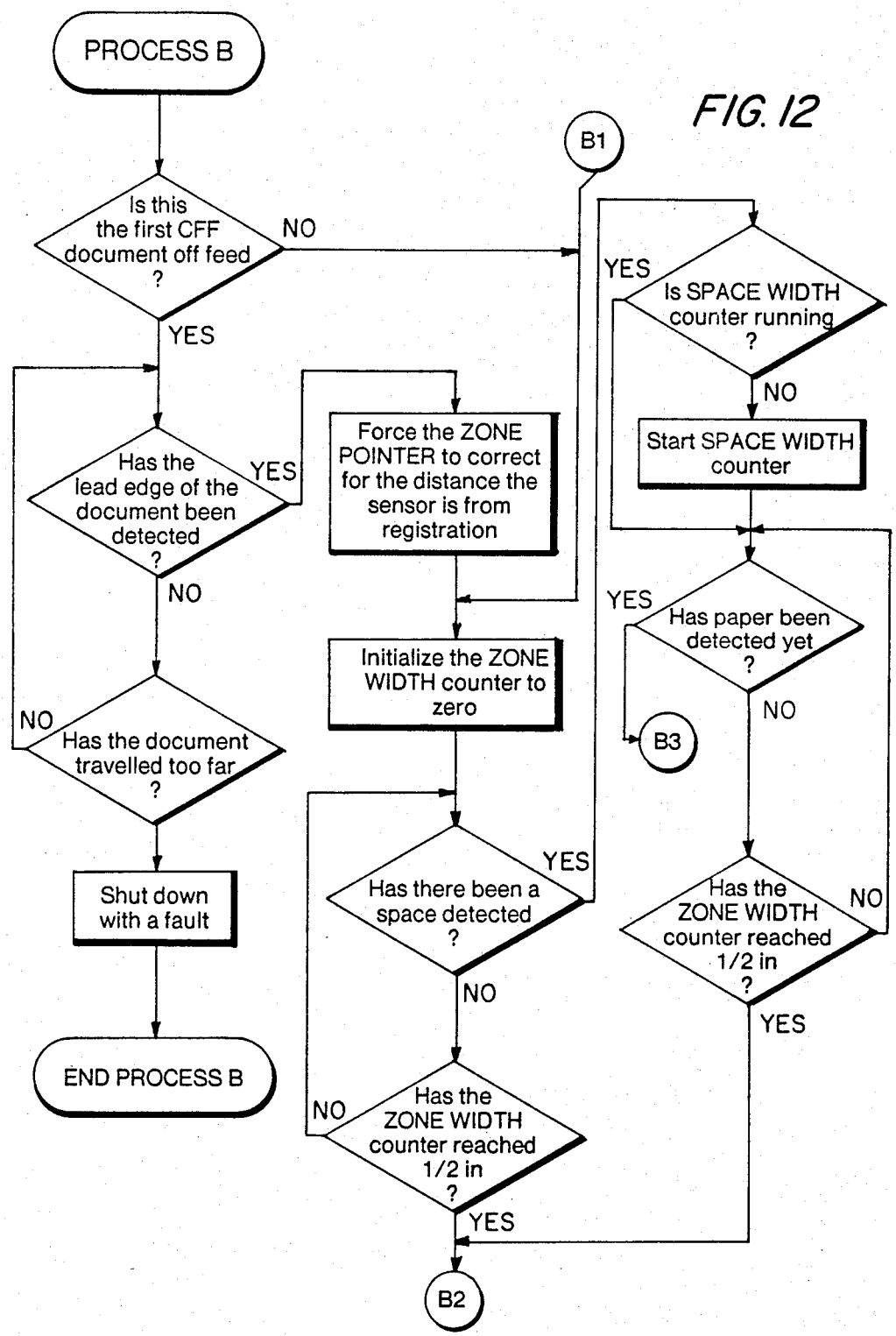
Figure 13:
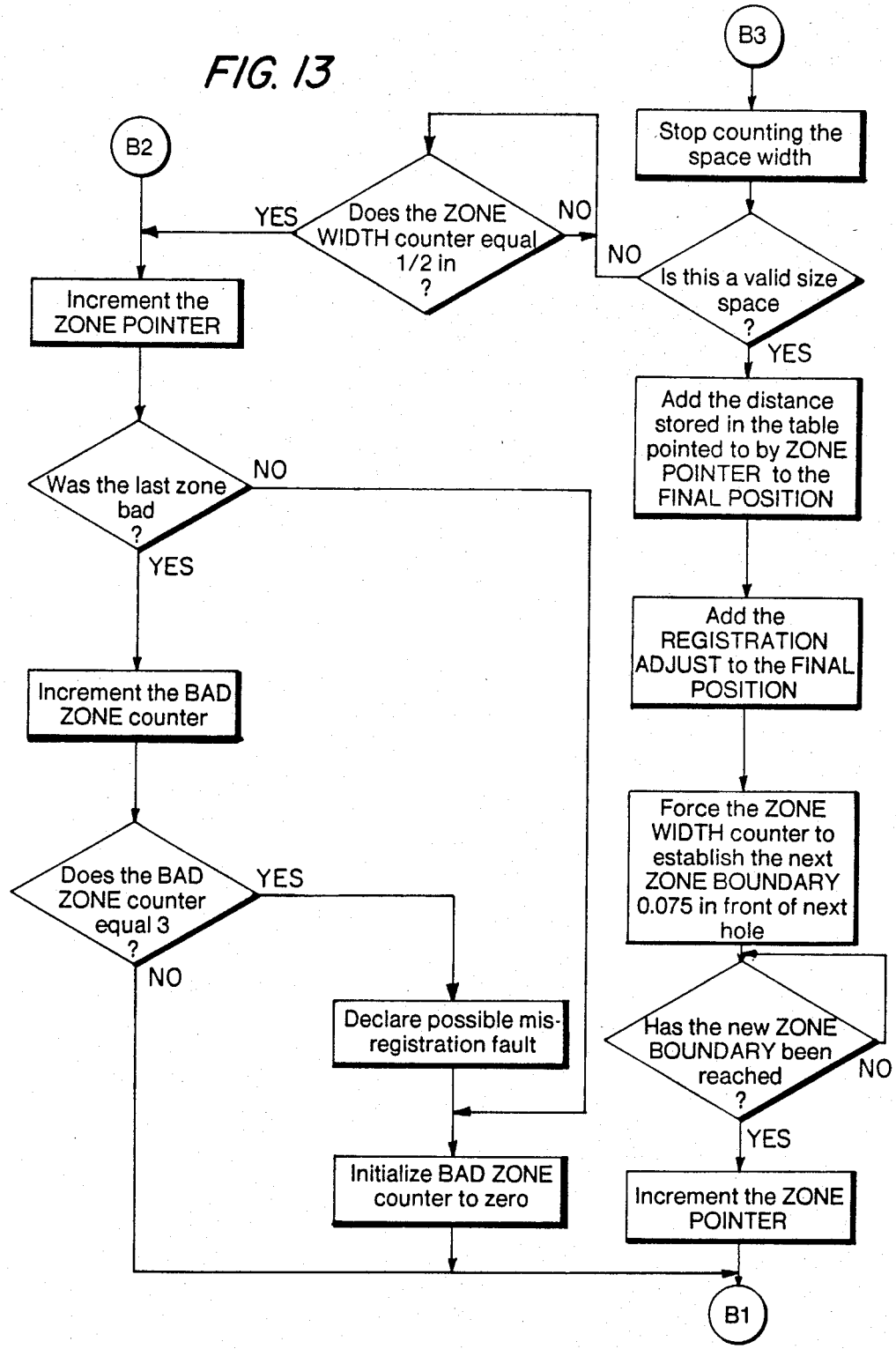

Flow charts for this approach to fanfold registration with the above-described hole validation and slip compensated servo controlled pinch roll drive are illustrated in FIGS. 11 to 13. There are actually three above-described processes running concurrently. These are the above-described velocity control of the servo to generate the motor M2 acceleration, constant run, and deceleration profile, the hole validations, and the monitoring of the counting and positions of the holes in the fanfold compared to the motor M2 encoder pulses for determining the final stopping location.

The terms that are capitalized in these FIGS. 11–13 flow charts are hereby capitalized and described. REGISTRATION ADJUST: This is a value between 0 and 15 that is stored in non-volatile memory. This number equates to a distance the web can be stopped in front of, or behind, the registration position. It is used to compensate for machine to machine dimensional tolerance. FORM SIZE: This is a value between 10 and 24 which represents the number of holes in the selected CF increment, i.e. the fanfold portion or segment being indexed. ZONE POINTER: This is a pointer that addresses a software table containing the "distance to go to the perf" (the desired registration position) from the trail edge of the hole detected within this particular zone. FINAL POSITION: This is the total number of motor encoder pulses that must be accumulated before reaching registration with that web increment. This value is continually modified by the hole monitoring algorithm. DECEL POSITION: This is the position on the velocity profile when the servo decelerates to a lower final velocity. It is always a fixed distance from FINAL POSITION. BAD ZONE COUNTER: This counter accumulates the number of consecutive zones in which there were no valid holes detected, as discussed above. Three consecutive bad zones could lead to a potential misregistration. ZONE WIDTH COUNTER: This counter accumulates the number of encoder pulses equal to the width of a zone.

It will be appreciated that various aspects of the above-described non-sprocket (frictional) computer forms web feeding apparatus and method may have other applications besides copier document transports. For example, various or all of the above-described hole validation, missing or unsensed hole, slip compensation techniques and other features may be used in a CF printer, typewriter, or the like for non-sprocket drive feeding or registering of CF or other webs with sprocket holes or other regular web indicia.

The embodiment disclosed herein, and others, provide an improved and automatic control, transporting and registration of a wide variety of documents particularly including computor form webs during the entire process of feeding, registering, deskewing, exposing for copying and ejecting the documents. It will also be appreciated that the embodiment described herein is merely exemplary and that other applications, variations, modifications, refinements, or alternative embodiments may be made by those skilled in the art from this teaching. They are intended to be encompassed by the following claims.

What is claimed is:

1. In a document handling apparatus for a copier having a platen for supporting and copying a document at the imaging station of the copier, the improvement in a dual mode document handling apparatus for automatically copying on said platen documents comprising either increments of computer form web original documents or individual original document sheets, comprising:
   common input means for receiving either of said documents,
   common frictional feeding means for moving either of said documents onto and over said platen,
   registration means for automatically positioning either of said documents for copying on said platen,
   sensing means for sensing when a computer form web document has been fed into said document handling apparatus through said common input means, and
   dual mode control means responsive to said sensing means for differently controlling said common feeding means and said registration means automatically, depending on whether a computer form web or individual sheet document has been fed into said document handling apparatus through said common input means;
   wherein the said common input means, said common feeding means and said registration means are operated by said dual mode control means in the same manner for the initial portion of computer forms web as for an individual document sheet but in a different manner for all subsequent portions of a computer forms web;

wherein said imaging station has a platen edge registration position, and werein said computer forms web increments and individual document sheets are both registered by said apparatus to said common platen edge registration position;

further including platen overlying document clamping means, and wherein said common frictional document feeding means includes a frictional feeding roller and an independently movable minor flap portion of said clamping means for resisting buckling of documents fed by said frictional roller, said roller extending through said flap portion over said platen, and said flap portion extending pivotably from adjacent said single roller to closely adjacent said platen registration edge position, further including automatic lifting and optical shuttering means for said frictional feeding roller to prevent exposure thereof during copying of a document sheet.

2. A document feeding apparatus for automatically feeding either individual sheet documents or computer form web documents to the imaging station of a copier for copying comprising:

common feeding means for automatically feeding either of said two types of documents to the imaging station, sensing means for automatically determining which of the two types of document is being fed by said common feeding means, and dual mode feeding and registration means controlled by said sensing means, having a first mode for individually feeding and registering individual document sheets automatically, and a second mode for incrementally feeding and registering incremental length segments of a computer forms web automatically.

said dual mode feeding and registration means automatically switching from said first mode to said second mode in response to said determination that the type of document being fed is a computer forms web, wherein said common feeding means for feeding both types of documents comprises a frictional feed wheel rotated over the platen and plural document nip exit rollers downstream of the platen, both commonly driven for different time periods in said first and second modes of operation, and wherein said frictional feed wheel is automatically lifted and optically shuttered to prevent its exposure during the copying of a document.

3. A method for automatically rapidly feeding document pages in a document path into registration over the platen of a copier wherein the document pages comprise either individual sheet documents or plural connected segments of an elongate computer forms web document, comprising the steps of:

initially commonly frictionally feeding either an individual sheet or the first said segment of a computer forms web automatically over the platen and accurately registering the leading edge of either over the platen in an individual sheet document mode with controlled slippage of said feeding against a mechanical registration gate automatically placed in the document path adjacent the downstream end of the platen regardless of whether the document is an individual sheet or the first segment of an elongate computer forms web;

automatically sensing that an elongate computer forms web document was so fed to the platen by sensing that the document length exceeds a preset length and also by sensing that said same document has sprocket holes;

and then automatically switching from said individual sheet document mode to a computer forms web document mode for feeding and registering of subsequent segments of a computer forms web in response to said sensing of an elongate computer forms web document with sprocket holes, or remaining in said individual sheet document mode if an elongate computer forms web document is not so sensed, wherein in said computer forms web document mode subsequent computer forms web segments feedings and registrations are accomplished by automatically incrementing the web over the platen in preset incremental feeding distances controlled by sensing and counting sprocket holes in the computer forms web and without utilizing said mechanical registration gate;

and wherein in said individual sheet document mode individual sheet registrations are accomplished by automatically appropriately cycling said mechanical registration gate in and out of the document path;

so that the leading edge of a computer forms web and all individual sheet documents are driven and registered against said mechanical registration gate over said platen.

4. Document feeding means for automatically feeding document pages in a document path into registration over the conventional platen of a copier, wherein the document pages comprise either individual sheet documents or plural connected (unseparated) segments of an elongate computer forms web document, comprising:

feeding means for initially commonly rapidly feeding either an individual sheet or the first segment of a computer forms web automatically over the platen and accurately registering the leading edge of either over the platen in an individual sheet document mode with controlled slippage of said feeding means against a mechanical registration gate automatically placed in the document path adjacent the downstream end of the platen regardless of whether the document is an individual sheet or the first segment of an elongate computer forms web;

means for automatically sensing that an elongate computer forms web document was so fed to the platen by sensing that the document length exceeds a preset length and by also sensing that said same document has sprocket holes;

and means for automatically switching from said individual sheet document mode to an elongate computer forms web document mode for the feeding and registering of subsequent segments of the computer forms web only in response to said sensing of an elongate computer forms web document with sprocket holes, wherein in said computer forms web document mode subsequent computer forms web segment feedings and registrations are accomplished by automatically incrementing the web with said feeding means in preset incremental feeding distances controlled by sensing and counting sprocket holes in the web and by means for maintaining said mechanical registration gate out of the document path;

and wherein in said individual sheet document mode individual sheet registrations are accomplished by means for appropriately automatically cycling said mechanical registration gate in and out of the document path and by feeding each individual sheet document against said registration gate with said feeding means while said registration gate is in said document path;

so that the leading edge of a computer forms web and all individual sheet documents, are driven and registered against said mechanical registration gate over said platen.

5. The apparatus of claim 4 wherein said document feeding means includes a slip-type frictional over-platen document transport for document registration and a non-slip document transport downstream of the platen.

6. The document feeding apparatus of claim 4 wherein said common feeding means for feeding both types of documents comprises a frictional feed wheel rotated over the platen and plural document nip exit rollers downstream of the platen, both commonly driven for different time periods in said first and second modes of operation.

7. In a document handling apparatus for a copier having a platen for supporting and copying a document at the imaging station of the copier, and a platen cover unit with a uniform imaging background surface overlying the platen, and frictional document feeding means in said platen cover unit for feeding a wide range of documents across said platen by frictional engagement therewith, said frictional document feeding means overlying said platen and extending through at least one aperture in said imaging background surface, the improvement comprising:

means for automatically detecting that the document to be fed by said document feeding means has both edge apertures of a defined pattern and a length exceeding a preset length, and automatically changing the operation of said document feeding means to an aperture count controlled incremental feeding computer form web mode of operation in response to detecting both;

automatic lifting means for automatically lifting said document feeding means into said platen cover unit through said aperture prior to copying a document on said platen;

and automatic shuttering means for automatically covering said aperture with an optically uniform shutter optically integral said uniform imaging background surface, after said automatic lifting means have lifted said document feeding means, to prevent copying of said aperture or said document feeding means, and then automatically opening said aperture after copying of a document on said platen;

said automatic lifting means, after said opening of said shutter, automatically lowering said document feeding means into feeding engagement with the document on the platen after the copying of the document.

8. The document handling apparatus of claim 7 wherein said automatic lifting means and said automatic shuttering means are integrally operated by integral camming means in said platen cover unit.

* * * * *